United States Patent [19]
Jan

[11] Patent Number: 5,822,917
[45] Date of Patent: Oct. 20, 1998

[54] MOLE CHASER

[76] Inventor: Te-Chin Jan, 24F-1, No. 161, Sung-Teh Rd., Taipei, Taiwan

[21] Appl. No.: 766,691

[22] Filed: Dec. 13, 1996

[51] Int. Cl.$^6$ ..................................................... A01M 1/20
[52] U.S. Cl. ............................................ 43/124; 116/22 A
[58] Field of Search ............................. 43/124; 116/22 A; 367/139; 340/384.7

[56] References Cited

U.S. PATENT DOCUMENTS 5,241,777  9/1993  Looker et al. ............................ 43/124

*Primary Examiner*—Kurt Rowan
*Attorney, Agent, or Firm*—W. Wayne Liauh

[57] ABSTRACT

An improvement for mole chaser over U.S. Pat. No. 5,205,066 granted to the applicant. The improvement includes a motor driven rotation vibrating means which has a pair of spaced doughnut-shaped rings and a main stem which houses a battery chamber and an impact member therein. The impact member has a plural number of convex bulges contactable with the rings. The rings will hit the bulges because of centrifugal force when the motor rotates and thus generating audio frequency vibration on the main stem for chasing moles away.

1 Claim, 5 Drawing Sheets

MOLE CHASER

BACKGROUND OF THE INVENTION

1. Field of the Invention

This invention relates to an improvement for mole chaser based on the applicant's previous patent U.S. Pat. No. 5,205,066 issued on Apr. 27, 1993, mainly using a motor and a rotational vibrating means to generate vibration and sound for creating improved effect to expell mole and other rodent animals.

2. Description of the Prior Art

In the U.S. Pat. No. 5,205,066, the applicant disclosed a mole chaser which includes an audio frequency circuit as shown in FIG. 1. The power supply passes R1 to charge Pin 7 of IC555 in a cyclic and periodic manner. The charging and discharging coefficient are about in a ratio of 1:7. The power passes D2 to supply to Pin 6 of IC555 to generate an oscillation, which is coupled with C2 to generate a charging- and -discharging cycle of 1–2 seconds. C2 charges Pin 7 through R2 and D1 to provide a triggering level. When a triggering level is reached, Pin 2 will make a reset. An output of driving voltage will be generated on Pin 3 to drive a buzzer 3406 to generate an audio vibration of a frequency ranging from 300 to 400 HZ on the main stem so as to provide a chaser effect to moles. In practical application, however, the intensity of audio vibration could not reach a desired level because the buzzer was actuated indirectly to induce vibration on the main stem.

SUMMARY OF THE INVENTION

In view of the aforesaid disadvantage, it is therefore an object of this invention to provide an improvement over the U.S. Pat. No. 5,205,066 by using a mechanical rotation vibrating means to make the main stem generating audio frequency vibration directly. The intensity of the vibration will be much stronger and thus enhancing the mole chasing effect.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
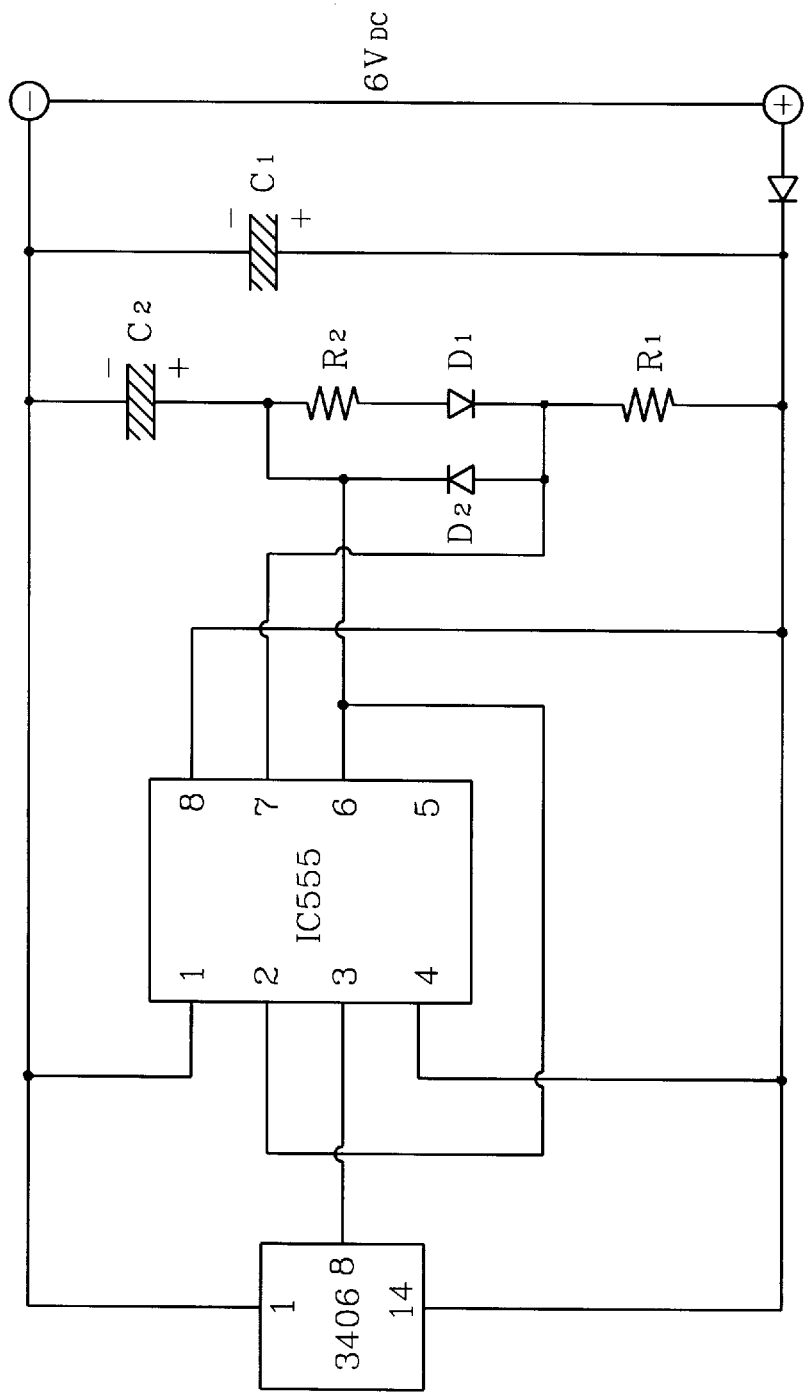
FIG. 1 is a diagram of an audio frequency circuit according to U.S. Pat. No. 5,205,066.
Figure 2:
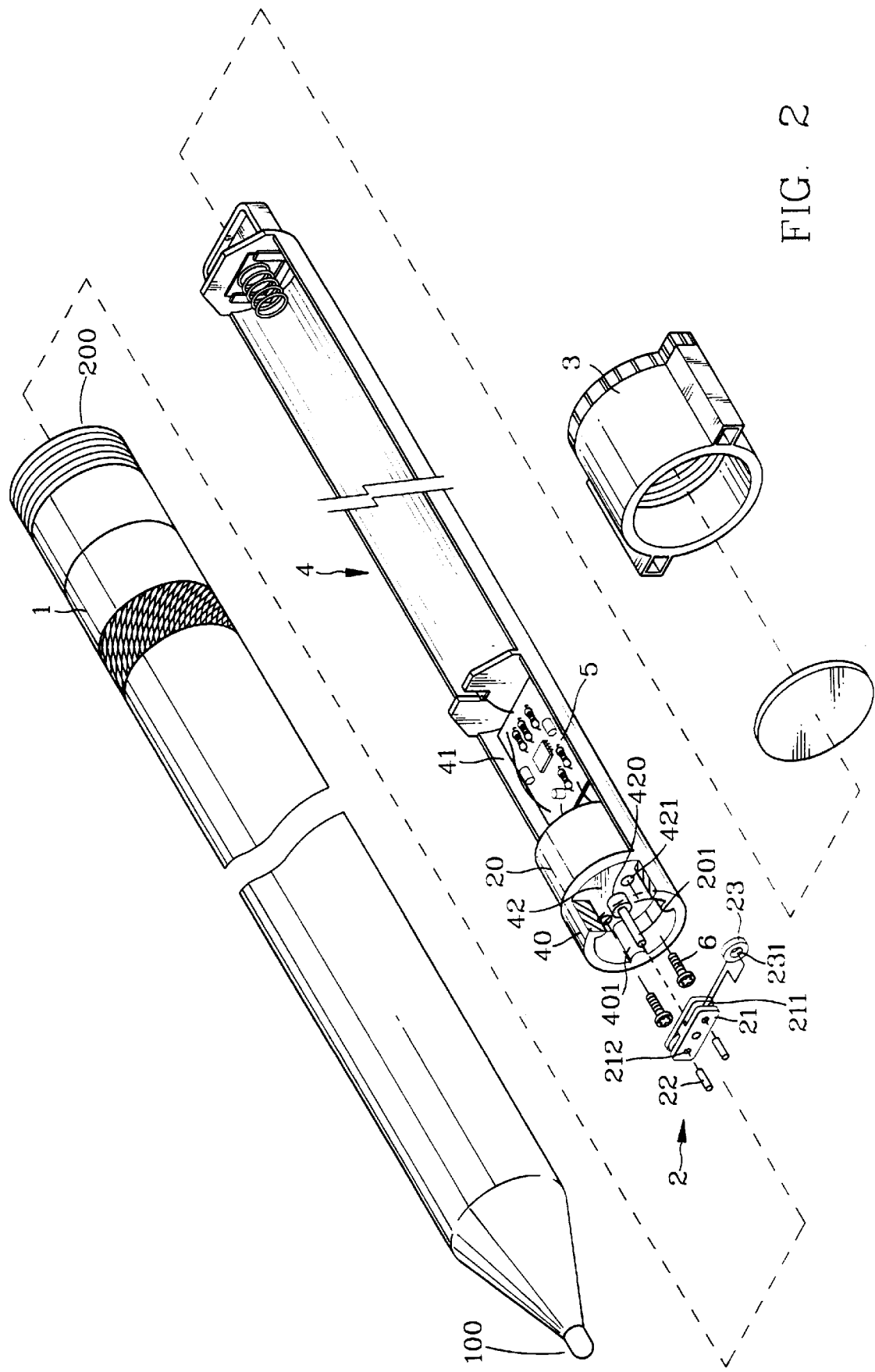
FIG. 2 is an exploded view of this invention.

Referring to FIG. 2, this invention includes a main stem 1, a rotation vibrating means 2, a cap 3, a battery chamber 4 and a control circuit 5. The main stem 1 and cap 3 are in general structured like that in U.S. Pat. No. 5,205,066 and form no part of this invention. Therefore their description is omitted. The improvements of this invention include the followings:

In front of the battery chamber 4, there is a separating wall 42 set between an impact member 40 and an open slot 41. The impact member 40 is a substantially hollow tube with a plural number of convex bulges 401 formed in the inside wall and with the separating wall 42 at the bottom. The separating wall 42 has a spindle opening 420 in the center and a pair of spaced apertures 421 located on two opposite sides of the spindle opening 420. A motor 20 is fixed to the separating wall 42 by means of a pair of screws 6 through the apertures 421. The motor 20 has a spindle 201 running through the spindle opening 420. Therefore the motor 20 is located in the open slot 41 on one side of the separating wall 42 while the spindle 201 is located on another side of the separating wall 42. FIG. 2 also shows the main stem contains a conical end 100 and open end 200.

Figure 3:
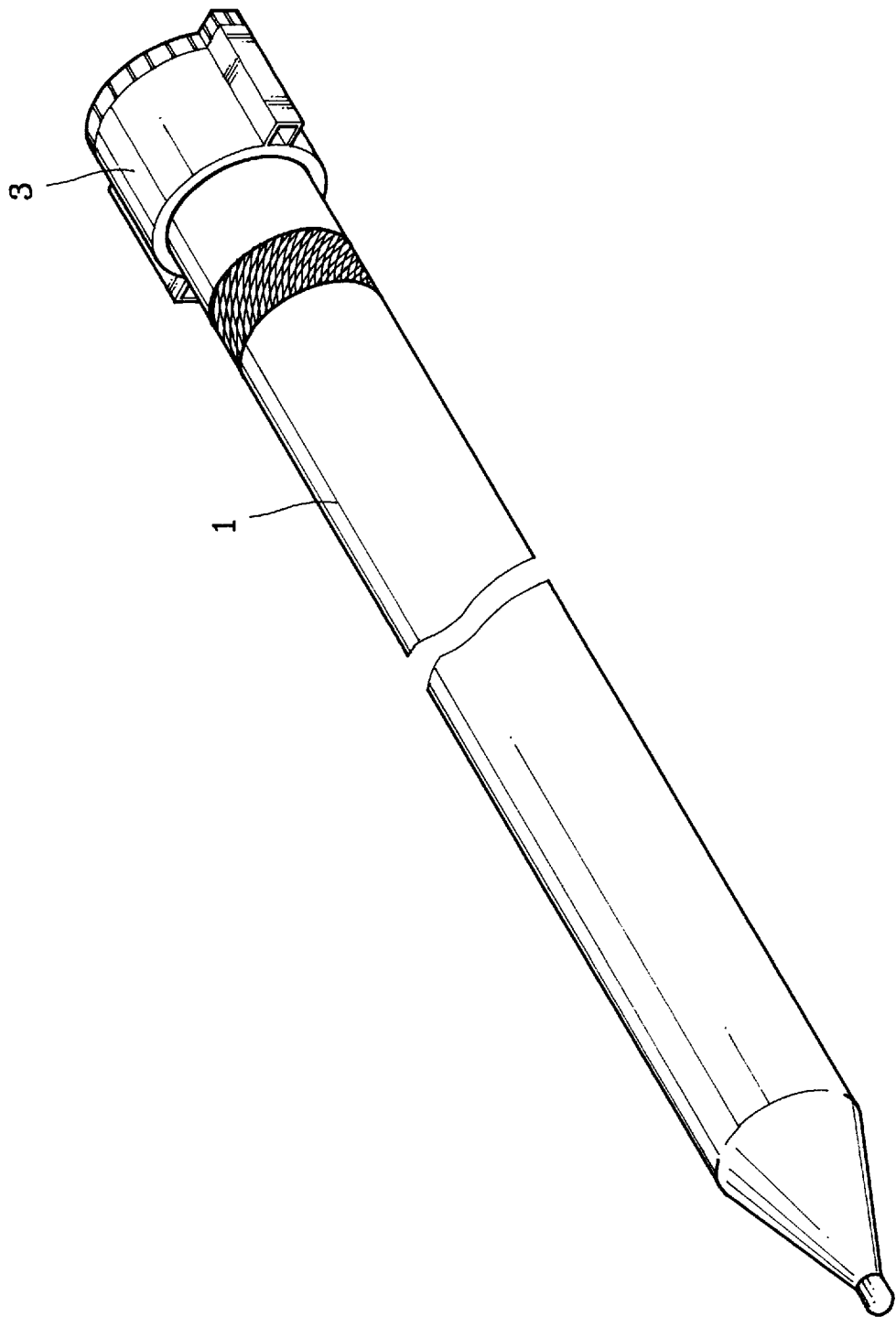
FIG. 3 is a perspective view of this invention.
Figure 4:
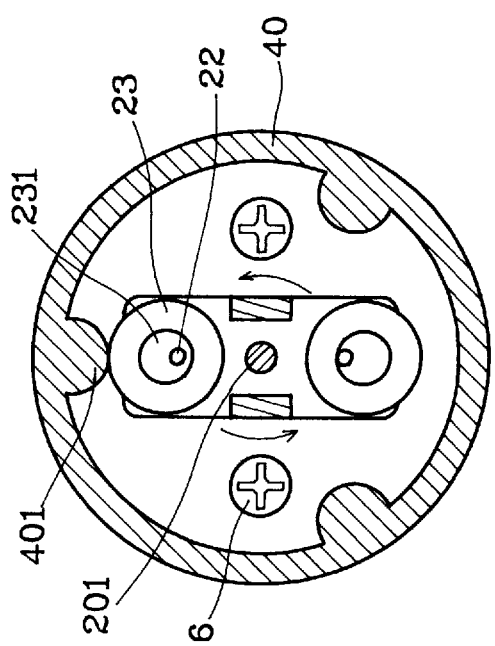
FIG. 4 is a sectional view of a rotation vibrating means of this invention.
Figure 5:
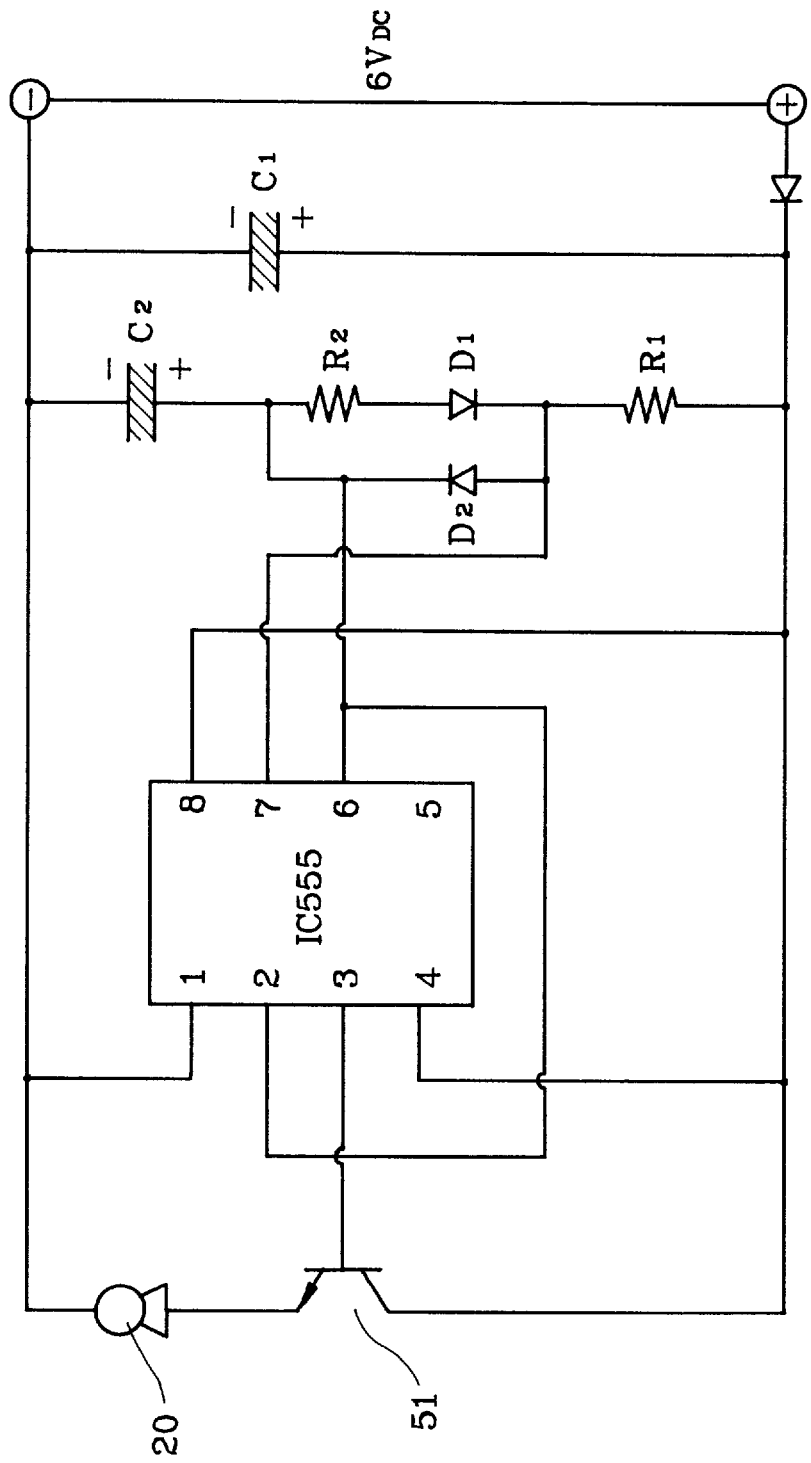
FIG. 5 is a circuit diagram of this invention.

The rotation vibrating means 2 includes the motor 20, a rotation block 21 fixedly attached to the motor spindle 201, a pair of doughnut-shaped rings 23 and a pair of pins 22 for holding the rings 23 in two spaced second slots 211 of the rotation block 21. Each ring 23 has a center opening 231 which has a large diameter than the outside diameter of the pin 22. Each pin 22 is held firmly on the rotation block 21 through a pair of apertures 212. Referring to FIGS. 4, and 5, when the control circuit 5 activates the motor 20, the motor spindle 201 and the rotation block 21 will be rotated. The rings 23 held in the second slots 211 will be moved outward because of centrifugal force, and thus hitting the convex bulges 401 and generating sound and vibration. As the ring 23 is doughnut-shaped and curved, and is moved outward by centrifugal force, the ring 23 will bounce back once hitting the convex bulges 401. Therefore both the rings 23 and the bulges 401 will not be damaged. The service life of the rings 23 and the bulges 401 thus will not be negatively impacted. A strong vibration and audio frequency will be generated on the main stem 1. The rotation vibrating means 2 set forth above is housed securely in the main stem 1. The cap 3 seals another end of the main stem 1 to form a water tight assembly (as shown in FIG. 3) so that it can be planted in the ground when in use.

FIG. 5 illustrates a circuit diagram of this invention. It is generally like the one shown in U.S. Pat. No. 5,206,066 except the method of producing audio sound vibration. A transistor 51 is being used to amplify the output voltage of Pin 3 in IC555 for driving the motor 20 to replace the buzzer 3406. It thus can be seen, this invention uses a mechanical vibration means to actuate the main stem directly for generating the audio vibration frequency instead of employing electronic parts to generate audio frequency and then to actuate the main stem for producing sonic vibration indirectly. Through this invention, a stronger vibration and audio frequency will be generated on the main stem to make mole chasing more effective.

I claim:

1. An improvement for a mole chaser comprising:
   (1) a main stem being a substantially hollow tube with one conical end and one open end;
   (2) a cap engageable with the open end of the main stem;
   (3) a battery chamber housed in the main stem including an impact member at a front end thereof and an open slot behind the impact member; the impact member having a separating wall at the bottom with a spindle opening at the center and a pair of spaced apertures, and a substantially hollow tube wall with a plurality of convex bulges formed on the inside circumference thereof;
   (4) a rotation vibrating means including a motor located in the open slot and screwed on one side of the separating wall through the spaced apertures, a motor spindle runs through the spindle opening of the separating wall, a rotation block fixedly attached to the motor spindle beyond a front surface of the separating wall having a pair of spaced second slots located at opposite sides of the motor spindle, each said second slot having pair of apertures in an axial direction of the main stem, and a pair of doughnut-shaped rings, each said doughnut-shaped ring being held in said second slot by a pin engaged with the two axial apertures, each said doughnut-shaped ring further having an opening with a larger diameter than the outside diameter of the pin, and said doughnut-shaped rings being contactable with the convex bulges when the motor spindle rotates;

(5) a control circuit located between the motor and the battery chamber for controlling the operation of the motor.

* * * * *